United States Patent
Wang et al.

(10) Patent No.: US 12,207,316 B2
(45) Date of Patent: Jan. 21, 2025

(54) CHANNEL ACCESS METHOD AND APPARATUS

(71) Applicant: Huawei Technologies Co., Ltd., Shenzhen (CN)

(72) Inventors: Ying Wang, Shenzhen (CN); Yunbo Li, Shenzhen (CN); Shimon Shilo, Hod Hasharon (IL); Genadiy Tsodik, Hod Hasharon (IL); Leonid Epstein, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 713 days.

(21) Appl. No.: 17/146,990

(22) Filed: Jan. 12, 2021

(65) Prior Publication Data

US 2021/0136817 A1    May 6, 2021

Related U.S. Application Data

(63) Continuation of application No. PCT/CN2019/091921, filed on Jun. 19, 2019.

(30) Foreign Application Priority Data

Jul. 12, 2018   (CN) .......................... 201810764316.6

(51) Int. Cl.
*H04W 74/0833*    (2024.01)
*H04L 1/00*    (2006.01)
(Continued)

(52) U.S. Cl.
CPC ......... *H04W 74/085* (2013.01); *H04L 1/0008* (2013.01); *H04W 74/002* (2013.01); *H04W 80/02* (2013.01)

(58) Field of Classification Search
CPC . H04W 74/085; H04W 74/008; H04W 80/02; H04W 84/12; H04W 74/0808; H04W 74/002; H04L 1/0008
See application file for complete search history.

(56) References Cited

U.S. PATENT DOCUMENTS

| 6,965,942 | B1 | 11/2005 | Young et al. | |
| 2002/0188750 | A1* | 12/2002 | Li | H04W 74/085 |
| | | | | 709/235 |

(Continued)

FOREIGN PATENT DOCUMENTS

| CN | 103415082 A | 11/2013 |
| CN | 103797885 A | 5/2014 |

(Continued)

OTHER PUBLICATIONS

Yoon et al., COTA: Channel occupancy time adaptation for LTE in unlicensed spectrum, Mar. 2017, 2017 IEEE International Symposium on Dynamic Spectrum Access Networks (DySPAN), whole document (Year: 2017).*

*Primary Examiner* — Michael Thier
*Assistant Examiner* — Jose L Perez
(74) *Attorney, Agent, or Firm* — Conley Rose, P.C.

(57) ABSTRACT

A channel access method and apparatus, where the method includes: determining, by a station, backoff duration based on a current first contention window; determining random padding duration based on a current second contention window when the backoff duration is reached; sending, on a channel, padding data whose duration is the random padding duration; detecting a state of the channel after the padding data is sent; and sending data on the channel if the state of the channel is an idle state.

20 Claims, 10 Drawing Sheets

(51) Int. Cl.
*H04W 74/00* (2009.01)
*H04W 80/02* (2009.01)

(56) References Cited

U.S. PATENT DOCUMENTS

| | | | | |
|---|---|---|---|---|
| 2013/0294394 | A1* | 11/2013 | Kneckt | H04W 72/04 370/329 |
| 2014/0247777 | A1 | 9/2014 | Cariou et al. | |
| 2015/0250002 | A1* | 9/2015 | Sun | H04W 74/0808 370/329 |
| 2015/0351128 | A1* | 12/2015 | Kim | H04W 74/085 370/329 |
| 2016/0128024 | A1* | 5/2016 | Frederiks | H04W 72/04 370/329 |
| 2016/0192363 | A1* | 6/2016 | Kasher | H04W 72/0446 370/329 |
| 2016/0302226 | A1* | 10/2016 | Kim | H04W 72/23 |
| 2017/0111931 | A1 | 4/2017 | Damnjanovic et al. | |
| 2017/0127404 | A1* | 5/2017 | Merlin | H04B 7/0413 |
| 2017/0257854 | A1* | 9/2017 | Yerramalli | H04W 74/002 |
| 2017/0311225 | A1 | 10/2017 | Li et al. | |
| 2018/0084574 | A1* | 3/2018 | Wong | H04W 74/04 |
| 2018/0110057 | A1* | 4/2018 | Park | H04B 7/0452 |
| 2018/0139781 | A1* | 5/2018 | Park | H04W 72/23 |
| 2018/0199375 | A1* | 7/2018 | Nezou | H04W 74/0816 |
| 2018/0376418 | A1 | 12/2018 | Li et al. | |
| 2019/0014596 | A1* | 1/2019 | Yang | H04W 72/21 |
| 2019/0082474 | A1* | 3/2019 | Jung | H04W 74/0891 |
| 2019/0274171 | A1* | 9/2019 | Viger | H04W 84/18 |
| 2019/0289615 | A1* | 9/2019 | Lee | H04W 36/06 |
| 2019/0289633 | A1* | 9/2019 | Fang | H04L 27/2601 |
| 2020/0374933 | A1* | 11/2020 | Lou | H04W 74/0808 |
| 2021/0266966 | A1* | 8/2021 | Baron | H04W 72/569 |

FOREIGN PATENT DOCUMENTS

| | | |
|---|---|---|
| CN | 104581979 A | 4/2015 |
| CN | 104640230 A | 5/2015 |
| CN | 107027161 A | 8/2017 |

* cited by examiner

CHANNEL ACCESS METHOD AND APPARATUS

CROSS-REFERENCE TO RELATED APPLICATIONS

This application is a continuation of International Patent Application No. PCT/CN2019/091921, filed on Jun. 19, 2019, which claims priority to Chinese Patent Application No. 201810764316.6, filed on Jul. 12, 2018. The disclosures of the aforementioned applications are hereby incorporated by reference in their entireties.

TECHNICAL FIELD

This application relates to the field of wireless communications technologies, and in particular, to a channel access method and apparatus.

BACKGROUND

The 802.11 protocol is a wireless communications protocol developed by the Institute of Electrical and Electronics Engineers (IEEE), and is mainly used for wireless communication between a wireless access point and a terminal and between terminals.

In the 802.11 protocol, an access point (AP) and several stations (STAs) form a basic service set (BSS). If a plurality of stations in the BSS simultaneously send data to the access point, a channel conflict is caused, thereby affecting wireless communication.

Therefore, how to avoid a channel conflict becomes an urgent technical problem to be resolved.

SUMMARY

Embodiments of this application provide a channel access method and apparatus, to reduce a channel conflict probability.

According to a first aspect, a channel access method is provided, and the method includes: determining, by a station, backoff duration based on a current first contention window; determining random padding duration based on a current second contention window when the backoff duration is reached; sending, on a channel, padding data whose duration is the random padding duration; detecting a state of the channel after the padding data is sent; and sending data on the channel if the state of the channel is an idle state.

According to the channel access method provided in the embodiments of this application, first, the station determines the backoff duration based on the current first contention window. Then, the station determines the random padding duration based on the current second contention window when the backoff duration is reached, and sends, on the channel, the padding data whose duration is the random padding duration. Later, the station detects the state of the channel after the padding data is sent. The station sends the data on the channel if the state of the channel is the idle state. In this way, after the station reduces a probability of a channel conflict with another station based on the backoff duration, the station further sends the padding data whose duration is the random padding duration and detects the state of the channel after the padding data is sent, thereby reducing the probability of a channel conflict with another station.

In a possible implementation, the method further includes: skipping sending the data on the channel if the state of the channel is a busy state.

In a possible implementation, the method further includes: updating the first contention window and/or the second contention window based on the state of the channel.

In a possible implementation, the updating the first contention window and/or the second contention window based on the state of the channel includes: updating the first contention window based on a first update policy if the state of the channel is the busy state, where the first update policy includes: keeping the first contention window unchanged; multiplying the first contention window by a first coefficient; or adding a constant to the first contention window.

According to the channel access method provided in the embodiments of this application, the station updates the first contention window based on the first update policy if the station detects that the state of the channel is the busy state. In this way, backoff duration determined by the station subsequently based on the updated first contention window becomes longer, thereby reducing the probability of a channel conflict with another station.

In a possible implementation, the updating the first contention window and/or the second contention window based on the state of the channel includes: updating the second contention window based on a second update policy if the state of the channel is the busy state, where the second update policy includes: keeping the second contention window unchanged; or multiplying the second contention window by a second coefficient.

According to the channel access method provided in the embodiments of this application, the station updates the second contention window based on the second update policy if the station detects that the state of the channel is the busy state. In this way, random padding duration determined by the station subsequently based on the updated second contention window becomes longer, thereby reducing the probability of a channel conflict with another station.

In a possible implementation, the updating the first contention window and/or the second contention window based on the state of the channel includes: modifying the first contention window to a first initial contention window if the state of the channel is the idle state.

According to the channel access method provided in the embodiments of this application, the station modifies the first contention window to the first initial contention window if the station detects that the state of the channel is the idle state. In this way, random padding duration determined by the station subsequently based on the updated first contention window becomes shorter, thereby improving channel utilization.

In a possible implementation, the updating the first contention window and/or the second contention window based on the state of the channel includes: modifying the second contention window to a second initial contention window if the state of the channel is the idle state.

According to the channel access method provided in the embodiments of this application, the station modifies the second contention window to the second initial contention window if the station detects that the state of the channel is the idle state. In this way, random padding duration determined by the station subsequently based on the updated second contention window becomes shorter, thereby improving channel utilization.

In a possible implementation, before the sending, on a channel, padding data whose duration is the random padding duration, the method further includes: sending a legacy preamble (L-preamble) on the channel, where a value of a length indication field in legacy signaling in the L-preamble is a sum of a length of a data packet that carries the L-preamble and a length of the padding data.

According to the channel access method provided in the embodiments of this application, the station sends the L-preamble on the channel before sending, on the channel, the padding data whose duration is the random padding duration. In this way, after receiving the L-preamble, the other station may determine that the state of the channel is the busy state, and give up sending data on the channel within duration corresponding to the value of the length indication field.

In a possible implementation, the data packet is a physical layer protocol data unit (PPDU), and a data field of the PPDU is empty.

According to the channel access method provided in the embodiments of this application, the station sends the PPDU on the channel before sending, on the channel, the padding data whose duration is the random padding duration. In this way, after receiving the PPDU, the other station may determine that the state of the channel is the busy state, and give up sending data on the channel within the duration corresponding to the value of the length indication field.

In a possible implementation, the data packet is the physical layer PPDU, a media access control (MAC) header in the data field of the PPDU includes a duration field, and a value of the duration field is a sum of the length of the padding data, a short interframe space (SIFS), and a length of the data. For example, a MAC frame in the data field is a clear to send (CTS)-to-self frame, and the MAC header of the MAC frame includes the duration field.

According to the channel access method provided in the embodiments of this application, the data packet is the physical layer PPDU. The MAC header in the data field of the PPDU includes the duration field, and the value of the duration field is a sum of the length of the padding data, the SIFS, and the length of the data. In this way, after receiving the PPDU, the other station may determine that the state of the channel is the busy state, and give up sending data on the channel within duration corresponding to the value of the duration field.

In a possible implementation, the data packet is a null data packet (NDP).

According to the channel access method provided in the embodiments of this application, the data packet is the NDP. In this way, after receiving the NDP, the other station may determine that the state of the channel is the busy state, and give up sending data on the channel within the duration corresponding to the value of the length indication field.

According to a second aspect, a channel access apparatus is provided, and the apparatus includes: a determining module configured to determine backoff duration based on a current first contention window, where the determining module is further configured to determine random padding duration based on a current second contention window when the backoff duration is reached; a sending module configured to send, on a channel, padding data whose duration is the random padding duration; and a detection module configured to detect a state of the channel after the padding data is sent, where the sending module is further configured to send data on the channel if the state of the channel is an idle state.

In a possible implementation, the sending module is further configured to skip sending the data on the channel if the state of the channel is a busy state.

In a possible implementation, the apparatus further includes: an update module configured to update the first contention window and/or the second contention window based on the state of the channel.

In a possible implementation, before sending, on the channel, the padding data whose duration is the random padding duration, the sending module is further configured to send a L-preamble on the channel, where a value of a length indication field in legacy signaling in the L-preamble is a sum of a length of a data packet that carries the L-preamble and a length of the padding data.

According to a third aspect, a communications apparatus is provided, and the communications apparatus includes a processor, a memory, and a transceiver, where the memory is configured to store a program instruction. The processor is configured to perform the following operations based on the program instruction stored in the memory: determining backoff duration based on a current first contention window; determining random padding duration based on a current second contention window when the backoff duration is reached; sending, on a channel, padding data whose duration is the random padding duration using the transceiver; detecting a state of the channel after the padding data is sent; and sending data on the channel using the transceiver if the state of the channel is an idle state.

In a possible implementation, the processor is further configured to perform the following operation based on the program instruction stored in the memory: skipping sending the data on the channel using the transceiver if the state of the channel is a busy state.

In a possible implementation, the processor is further configured to perform the following operation based on the program instruction stored in the memory: updating the first contention window and/or the second contention window based on the state of the channel.

In a possible implementation, that the processor updates the first contention window and/or the second contention window based on the state of the channel includes: updating the first contention window based on a first update policy if the state of the channel is the busy state, where the first update policy includes: keeping the first contention window unchanged; multiplying the first contention window by a first coefficient; or adding a constant to the first contention window.

In a possible implementation, that the processor updates the first contention window and/or the second contention window based on the state of the channel includes: updating the second contention window based on a second update policy if the state of the channel is the busy state, where the second update policy includes: keeping the second contention window unchanged; or multiplying the second contention window by a second coefficient.

In a possible implementation, that the processor updates the first contention window and/or the second contention window based on the state of the channel includes: modifying the first contention window to a first initial contention window if the state of the channel is the idle state.

In a possible implementation, that the processor updates the first contention window and/or the second contention window based on the state of the channel includes: modifying the second contention window to a second initial contention window if the state of the channel is the idle state.

In a possible implementation, before the processor sends, on the channel, the padding data whose duration is the random padding duration, the processor is further configured to perform the following operation based on the program instruction stored in the memory: sending a L-preamble on the channel using the transceiver, where a value of a length indication field in legacy signaling in the L-preamble is a sum of a length of a data packet that carries the L-preamble and a length of the padding data.

In a possible implementation, the data packet is a PPDU, and a data field of the PPDU is empty.

In a possible implementation, the data packet is the physical layer PPDU, a MAC header in the data field of the PPDU includes a duration field, and a value of the duration field is a sum of the length of the padding data, an SIFS, and a length of the data.

In a possible implementation, the data packet is an NDP.

In a possible implementation, the communications apparatus may be a station, or may be a chip in the station.

In a possible implementation, the processor includes the determining module, the detection module, and the update module in the second aspect.

The determining module is configured to determine the backoff duration based on the current first contention window; and the determining module is further configured to determine the random padding duration based on the current second contention window when the backoff duration is reached.

The detection module is configured to detect the state of the channel after the padding data is sent.

The update module is configured to update the first contention window based on the first update policy if the state of the channel is the busy state; the update module is further configured to update the second contention window based on the second update policy if the state of the channel is the busy state; the update module is further configured to modify the first contention window to the first initial contention window if the state of the channel is the idle state; and the update module is further configured to modify the second contention window to the second initial contention window if the state of the channel is the idle state. Before the processor sends, on the channel, the padding data whose duration is the random padding duration using the transceiver, the processor is further configured to send the L-preamble on the channel using the transceiver, where the value of the length indication field in the legacy signaling in the L-preamble is the sum of the length of the data packet that carries the L-preamble and the length of the padding data.

According to a fourth aspect, a computer-readable storage medium is provided, including an instruction; and when the instruction runs on a computer, the computer is enabled to perform the method according to the first aspect.

According to the channel access method provided in the embodiments of this application, first, a station determines backoff duration based on a current first contention window. Then, the station determines random padding duration based on a current second contention window when the backoff duration is reached, and sends, on a channel, padding data whose duration is the random padding duration. Later, the station detects a state of the channel after the padding data is sent. The station sends data on the channel if the state of the channel is an idle state. In this way, after the station reduces a probability of a channel conflict with another station based on the backoff duration, the station further sends the padding data whose duration is the random padding duration and detects the state of the channel after the padding data is sent, thereby reducing the probability of a channel conflict with another station through a two-layer backoff mechanism.

DESCRIPTION OF EMBODIMENTS

Figure 1:
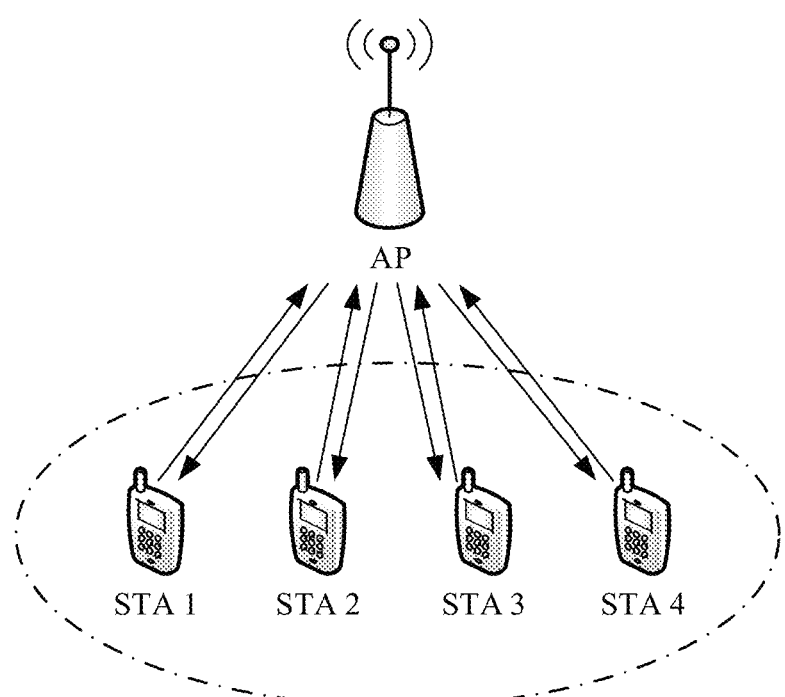
FIG. 1 is an architectural diagram of a communications network system according to an embodiment of this application.

FIG. 1 is an architectural diagram of a communications network system according to an embodiment of the present disclosure. As shown in FIG. 1, the system includes a plurality of BSSs, and each BSS includes one AP and a plurality of STAs. The AP is a device that enables the STA to access a wireless network in a communications system, and may also be referred to as a radio access network (RAN) node (or device), a base station, or the like. Currently, some examples of the AP are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B (HNB)), a baseband unit (BBU), a Wi-Fi access point, and another interface device that can work in a wireless environment. The STA is a device that has a wireless connection function and that can provide voice and/or data connectivity for a user, and may also be referred to as a terminal device, a user equipment (UE), a mobile station (MS), a mobile terminal (MT), or the like. Currently, some examples of the STA include a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a vehicle-mounted device, or the like. A station in the embodiments of this application may be the foregoing AP, or may also be the foregoing STA.

Contention window: In the IEEE 802.11 protocol, when a transmission medium changes from a busy state to an idle state, a plurality of STAs may simultaneously start to send data. To reduce a channel collision probability, the STA randomly generates a backoff value, delays time sequence duration of the backoff value (that is, backoff duration) before preparing to transmit data, and then performs transmission. The contention window limits a generation interval of the backoff value. For example, the randomly generated backoff value is a random integer that is evenly distributed in an interval [0, contention window].

Currently, the IEEE 802.11 protocol may include the IEEE 802.11p protocol, the IEEE 802.11 next generation vehicle to everything (NGV) communications protocol, and the IEEE 1609 standard. IEEE 802.11p is a protocol mainly used for in-vehicle communication, and is mainly used to define a manner of exchanging information and data between vehicles and between a vehicle and a roadside infrastructure. In IEEE 802.11p, channels are classified into a control channel (CCH) and a service channel (SCH). The CCH is responsible for transmitting security-related information, control information, and the like. The SCH is responsible for transmitting non-security-related information. Time is divided into several time sequences. At the beginning of each time sequence, the STA may select any channel (for example, a CCH or an SCH) for data transmission. In addition, in IEEE 802.11p, broadcast and multicast account for a majority of the data transmission. The IEEE 802.11 NGV protocol is a next-generation vehicle to everything communications protocol based on IEEE 802.11p, and is mainly used to improve various transmission performance (for example, reduce an information transmission delay, increase a transmission rate, and enhance channel utilization). The IEEE 1609 standard is a high-level standard based on the IEEE 802.11p communications protocol. The IEEE 802.11p and IEEE 1609 standards define in-vehicle communication for dedicated short-range communications (DSRC).

In a 802.11 network with dense distribution, when the plurality of STAs need to send data on a channel, and media access control (MAC) protocol data unit (MPDU) transmission queues of the plurality of STAs on the channel are not empty, the plurality of STAs simultaneously send data on the channel, thereby resulting in the channel collision. Currently, STAs in IEEE 802.11ax use a distributed coordination function (DCF) to reduce the channel collision. Each STA performs random backoff processing based on a pre-stored contention window (CW) before sending data. In this way, the STA may reduce the probability of a channel collision that occurs when the STA and another STA simultaneously send data. Subsequently, when the STA detects an acknowledgment (ACK) timeout, the STA may further double the CW, to further reduce the probability of a channel collision that occurs when the STA and another STA simultaneously send data. However, in the 802.11 network with dense distribution, because there are a relatively large quantity of STAs, the probability of a channel collision between STAs is still high.

Figure 2:
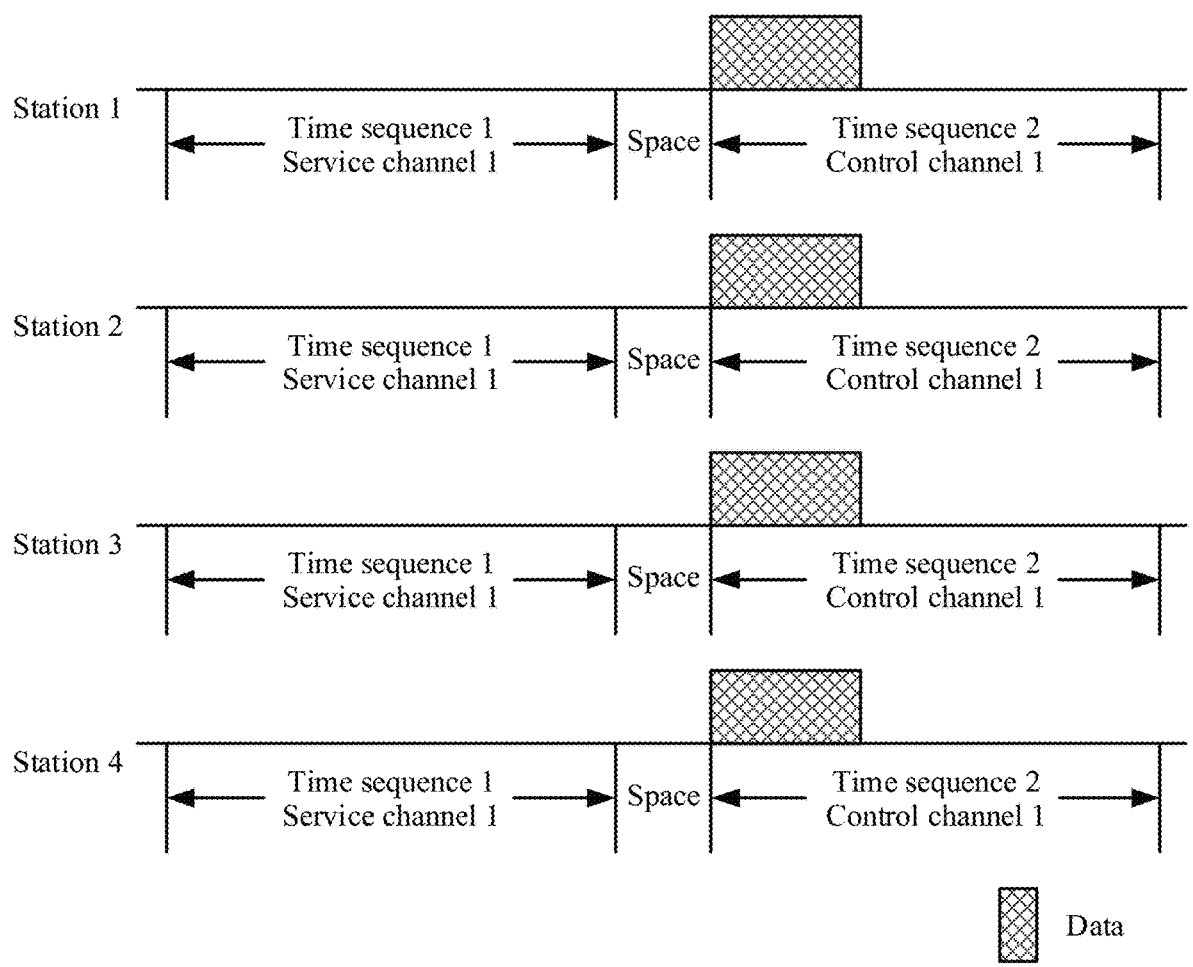
FIG. 2 is a schematic diagram of a channel conflict according to an embodiment of this application.

In the 802.11p protocol, the STA performs channel switching using the time sequence as a unit (that is, at the beginning of the time sequence, the STA selects one channel for data transmission). When the plurality of STAs switch to a same channel at a same time, and when the MPDU transmission queues of the plurality of STAs on the channel are not empty, the plurality of STAs simultaneously send data on the channel, thereby resulting in a channel collision. As shown in FIG. 1 and FIG. 2, an STA 1, an STA 2, an STA 3, and an STA 4 simultaneously switch to the CCH in a time sequence 2. In this case, the STA 1, the STA 2, the STA 3, and the STA 4 simultaneously send data in the MPDU transmission queues on the CCH channel at the beginning of the time sequence 2, thereby resulting in a channel collision. In IEEE 802.11p, the STA also uses the DCF to reduce a channel collision. Each STA performs random backoff processing based on the pre-stored CW before a time sequence start moment of channel switching, to reduce the probability of a channel collision that occurs when the plurality of STAs simultaneously perform data transmission. However, based on the 802.11p and IEEE 802.11 NGV scenarios, most data transmission occurs during broadcast and multicast. Because there is no ACK mechanism for the broadcast and the multicast, a channel contention degree cannot be estimated and the CW cannot be updated (that is, the CW is a fixed value) based on an ACK timeout. In this way, although the DCF is used to reduce the channel collision probability, in broadcast/multicast transmission in the 802.11p and IEEE 802.11 NGV scenarios, the probability of a channel collision between the plurality of STAs is still high, and frequent channel collisions between STAs reduce a transmission rate of the STA and the channel utilization. In addition, for the broadcast/multicast transmission, because there is no ACK mechanism, a fixed CW cannot reflect a current channel contention degree, and the CW cannot be adjusted with the contention degree. Therefore, an excessively small pre-stored CW causes a large quantity of channel collisions, and an excessively large pre-stored CW causes relatively low channel utilization.

To resolve the foregoing problem, an embodiment of this application provides a channel access method. First, a station determines backoff duration based on a current first contention window. Then, the station determines random padding duration based on a current second contention window when the backoff duration is reached, and sends, on a channel, padding data whose duration is the random padding duration. Later, the station detects a state of the channel after the padding data is sent. If the state of the channel is an idle state, the station sends the data on the channel, modifies the first contention window to a first initial contention window, and modifies the second contention window to a second initial contention window. If the state of the channel is a busy state, the station skips sending the data on the channel, updates the first contention window based on a first update policy, and updates the second contention window based on a second update policy. In this way, when accessing the channel, the station may avoid a channel conflict with another station through a two-layer backoff mechanism, and update the contention window based on a channel contention degree.

Figure 3:
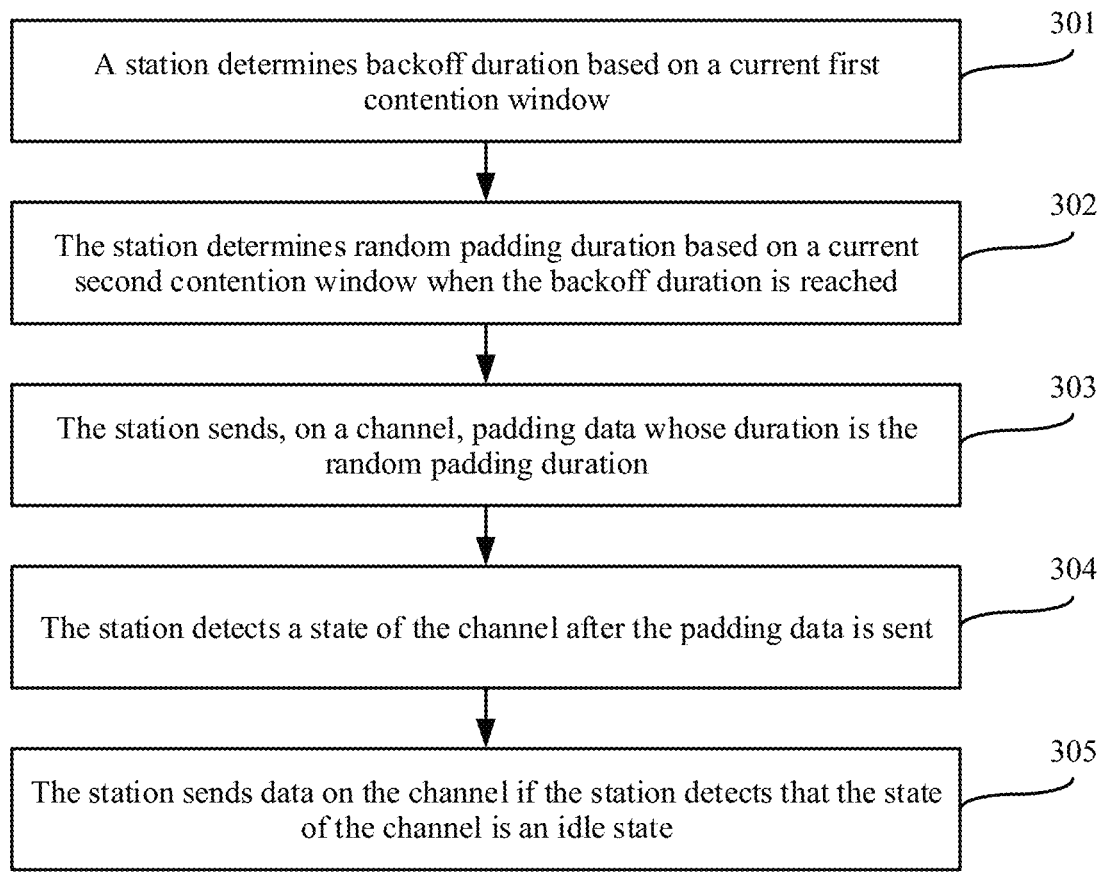
FIG. 3 is a flowchart of a channel access method according to an embodiment of this application.

The following describes in detail the channel access method provided in this embodiment of this application with reference to an implementation. As shown in FIG. 3, the steps are as follows.

Step 301. A station determines backoff duration based on a current first contention window.

In implementation, the station may pre-store the first contention window, the first contention window may be set by a person skilled in the art based on experience, and the station may update the first contention window based on a state of a channel. A processing process in which the station updates the first contention window based on the state of the channel is subsequently described in detail.

When the station needs to send data on a channel, the station may randomly determine, based on the first contention window, a first positive integer (that is the backoff duration) less than or equal to the first contention window.

Figure 4:
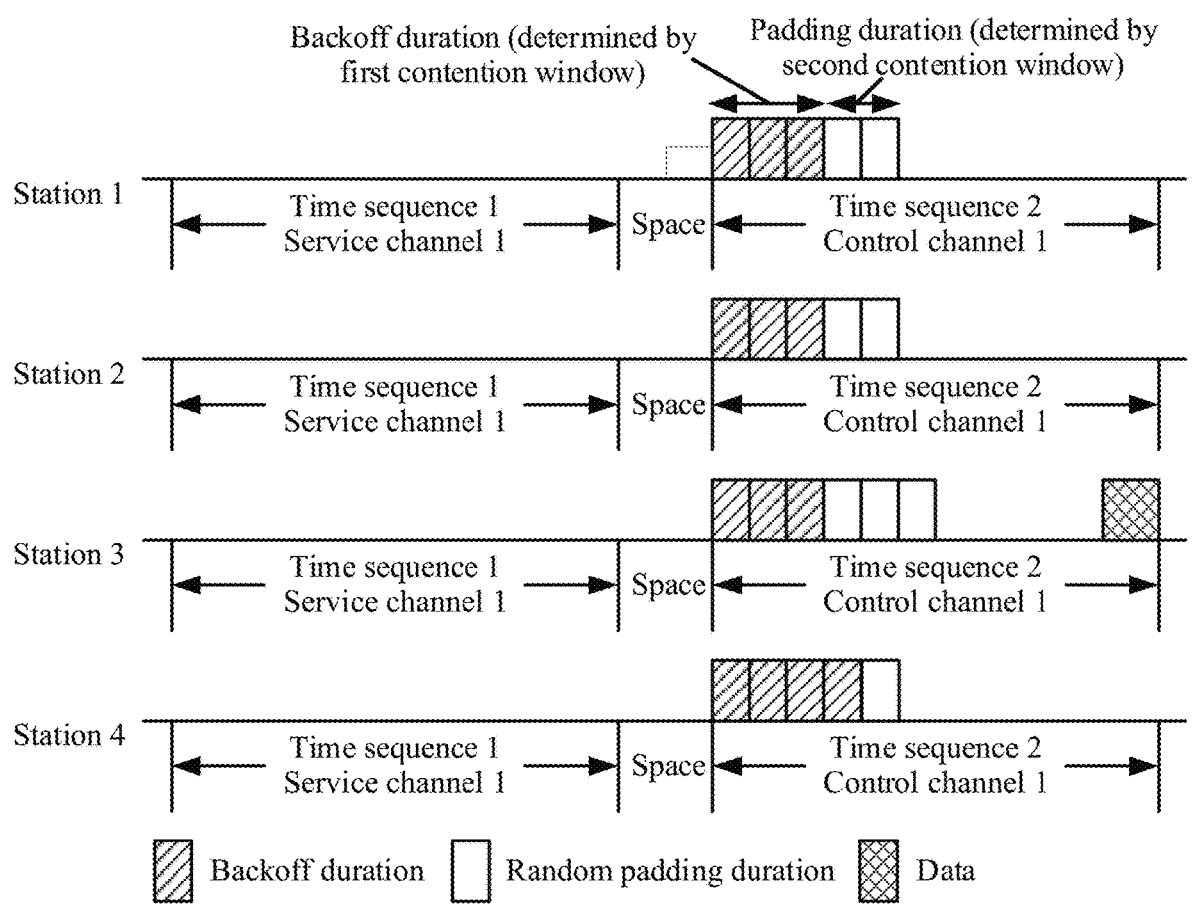
FIG. 4 is a schematic diagram of a channel access method according to an embodiment of this application.

The scenario shown in FIG. 1 is used as an example. In FIG. 4, a station 1 determines, based on the current first contention window, that the backoff duration is 3; a station 2 determines, based on the current first contention window, that the backoff duration is 3; a station 3 determines, based on the current first contention window, that the backoff duration is 3; and a station 4 determines, based on the current first contention window, that the backoff duration is 4.

Step 302. The station determines random padding duration based on a current second contention window when the backoff duration is reached.

In implementation, the station may pre-store the second contention window, the second contention window may be set by a person skilled in the art based on experience, and the station may update the second contention window based on the state of the channel. The processing process in which the station updates the second contention window based on the state of the channel is subsequently described in detail. The station may further pre-store unit timeslot duration. The unit timeslot duration may be set by a person skilled in the art based on experience, or may be specified in a protocol, or may be notified by an access point (AP) to the station in advance. This is not specifically limited in this embodiment of this application. The unit timeslot duration may be greater than or equal to a sum of receive/transmit state switching duration of the station and channel state detection duration of the station. The receive/transmit state switching duration of the station is duration for the station to switch from a state of sending data to a state of receiving data, or duration for the station to switch from the state of receiving data to the state of sending data. The channel state detection duration of the station is duration for the station to determine the state of the channel using a detection algorithm, for example, duration for the station to perform clear channel assessment (CCA) detection.

The station may start a first timer after the station determines the backoff duration. The first timer may perform timing based on a preset timing policy (for example, in ascending or descending order). When the first timer progressively increases from 0 to the backoff duration, the station may randomly determine a second positive integer less than or equal to the second contention window. Alternatively, when the first timer progressively decreases from the backoff duration to 0, the station may randomly determine, based on the second contention window, a second positive integer less than or equal to the second contention window. Then, the second positive integer is multiplied by the unit timeslot duration, to obtain the random padding duration.

The scenario shown in FIG. 1 is used as an example. In FIG. 4, the station 1 determines, based on the current second contention window, that the random padding duration is duration of two unit timeslots; the station 2 determines, based on the current second contention window, that the random padding duration is duration of two unit timeslots; the station 3 determines, based on the current second contention window, that the random padding duration is duration of three unit timeslots; the station 4 determines, based on the current second contention window, that the random padding duration is duration of one unit timeslot.

Step 303. The station sends, on a channel, padding data whose duration is the random padding duration.

In implementation, the station may send, on the channel, the padding data whose duration is the random padding duration after determining the random padding duration. The scenario shown in FIG. 1 is used as an example. In FIG. 4, the station 1 sends padding data whose duration is duration of two unit timeslots; the station 2 sends padding data whose duration is duration of two unit timeslots; the station 3 sends padding data whose duration is duration of three unit timeslots; and the station 4 sends padding data whose duration is duration of one unit timeslot.

Step 304. The station detects a state of the channel after the padding data is sent.

In implementation, the station may further detect the state of the channel after the padding data is sent. The station may select a CCA algorithm to detect the state of the channel, or may use another algorithm to detect the state of the channel. This is not limited in this embodiment of this application.

Step 305. The station sends data on the channel if the station detects that the state of the channel is an idle state.

In implementation, if the station detects that the state of the channel is the idle state, it indicates that currently no another station sends data on the channel, and correspondingly the station may send data on the channel.

It should be noted that when sending data, the station may send the data on the channel after waiting for a short interframe space (SIFS) duration.

The scenario shown in FIG. 1 is used as an example. In FIG. 4, the station 3 may further detect the state of the channel after the padding data of the station 3 is sent. In this case, no another station sends data on the channel. Therefore, the station 3 detects that the state of the channel is the idle state, and the station 3 may send data on the channel after waiting for the SIFS duration.

Optionally, the station does not send data on the channel if the station detects that the state of the channel is the busy state.

In implementation, if the station detects that the state of the channel is the busy state, it indicates that currently another station sends data on the channel, and the station may give up sending data on the channel.

The scenario shown in FIG. 1 is used as an example. In FIG. 4, the station 4 may further detect the state of the channel after the padding data of the station 4 is sent. In this case, the station 3 sends the padding data on the channel. Therefore, the station 4 does not send data on the channel when the station 4 detects that the state of the channel is the busy state.

Optionally, an embodiment of this application further provides a method for updating the first contention window based on the state of the channel. The processing process is updating the first contention window and/or the second contention window based on the state of the channel.

In implementation, the station may update the first contention window and/or the second contention window based on the state of the channel after the station detects the state of the channel. When the station detects that the state of the channel is the idle state, the station may update only the first contention window, may update only the second contention window, or may update both the first contention window and the second contention window. Correspondingly, when the station detects that the state of the channel is the busy state, the station may update only the first contention window, may update only the second contention window, or may update both the first contention window and the second contention window. This is not limited in this embodiment of this application. The processing processes of updating the first contention window and the second contention window based on the state of the channel by the station are as follows.

Scenario 1. Updating the first contention window based on a first update policy if the state of the channel is the busy state.

The first update policy includes: keeping the first contention window unchanged; multiplying the first contention window by a first coefficient; or adding a constant to the first contention window.

In implementation, the first update policy may be pre-stored by the station, the first update policy may be indicated by the access point to the station, the first update policy may be specified in a protocol, or the first update policy may be set by a person skilled in the art based on experience.

If the station detects that the state of the channel is the busy state, it indicates that a current channel contention degree is relatively high. The station may update the first contention window based on the first update policy. The first update policy includes: keeping the first contention window unchanged; multiplying the first contention window by the first coefficient; or adding the constant to the first contention window. In this way, backoff duration determined by the station subsequently based on the updated first contention window becomes longer, thereby reducing a probability of a channel conflict with another station. For example, the current first contention window is 50, and the first coefficient is 2. If the station detects that the state of the channel is the busy state, the station may multiply the first contention window by the first coefficient, and correspondingly the first contention window is 100.

It should be noted that the station may further update the first contention window in another manner or using an update policy. This is not limited in this embodiment of this application.

Scenario 2. Updating the first contention window and/or the second contention window based on the state of the channel, including: updating the second contention window based on a second update policy if the state of the channel is the busy state.

The second update policy includes: keeping the second contention window unchanged; or multiplying the second contention window by a second coefficient.

In implementation, the second update policy may be pre-stored by the station, the second update policy may be indicated to the station by the access point, the second update policy may be specified in a protocol, or the second update policy may be set by a person skilled in the art based on experience.

If the station detects that the state of the channel is the busy state, it indicates that the current channel contention degree is relatively high. The station may update the second contention window based on the second update policy. The second update policy includes: keeping the second contention window unchanged; or multiplying the second contention window by the second coefficient. In this way, random padding duration determined by the station subsequently based on the updated second contention window becomes longer, thereby reducing the probability of a channel conflict with another station. For example, the current second contention window is 100, and the second coefficient is 1.5. If the station detects that the state of the channel is the busy state, the station may multiply the second contention window by the second coefficient, and correspondingly the second contention window is 150.

It should be noted that the station may further update the second contention window in another manner or using an update policy. This is not limited in this embodiment of this application.

Scenario 3. Modifying the first contention window to the first initial contention window if the state of the channel is the idle state.

In implementation, the first initial contention window may be pre-stored by the station, or the first initial contention window may be set by a person skilled in the art based on experience. The first initial contention window may be an initial value of the first contention window. If the station detects that the state of the channel is the idle state, it indicates that the current channel contention degree is relatively low. The station may modify the first contention window to the first initial contention window. In this way, random padding duration determined by the station subsequently based on the updated first contention window becomes shorter, thereby improving channel utilization. For example, the current first contention window is 50, and the first initial window is 20. The station may modify the first contention window to 20 if the station detects that the state of the channel is the idle state.

Scenario 4. Modifying the second contention window to the second initial contention window if the state of the channel is the idle state.

In implementation, the second initial contention window may be pre-stored by the station, or the second initial contention window may be set by a person skilled in the art based on experience. The second initial contention window may be an initial value of the second contention window. If the station detects that the state of the channel is the idle state, it indicates that the current channel contention degree is relatively low. The station may modify the second contention window to the second initial contention window. In this way, random padding duration determined by the station subsequently based on the updated second contention window becomes shorter, thereby improving channel utilization. For example, the current second contention window is 100, and the second initial window is 50. The station may modify the second contention window to 50 if the station detects that the state of the channel is the idle state.

In implementation, the first initial contention window and the second initial contention window may be stored in the station, or may be indicated by the access point to the station, or may be specified in a protocol, or may be set by a person skilled in the art based on experience. This is not specifically limited in this embodiment of this application.

According to the channel access method provided in this embodiment of this application, first, the station determines the backoff duration based on the current first contention window. Then, the station determines the random padding duration based on the current second contention window when the backoff duration is reached, and sends, on the channel, the padding data whose duration is the random padding duration. Later, the station detects the state of the channel after the padding data is sent. The station sends the data on the channel if the state of the channel is the idle state. In this way, after the station reduces a probability of a channel conflict with another station based on the backoff duration, the station further sends the padding data whose duration is the random padding duration and detects the state of the channel after the padding data is sent, thereby further reducing the probability of a channel conflict with another station.

Figure 5:
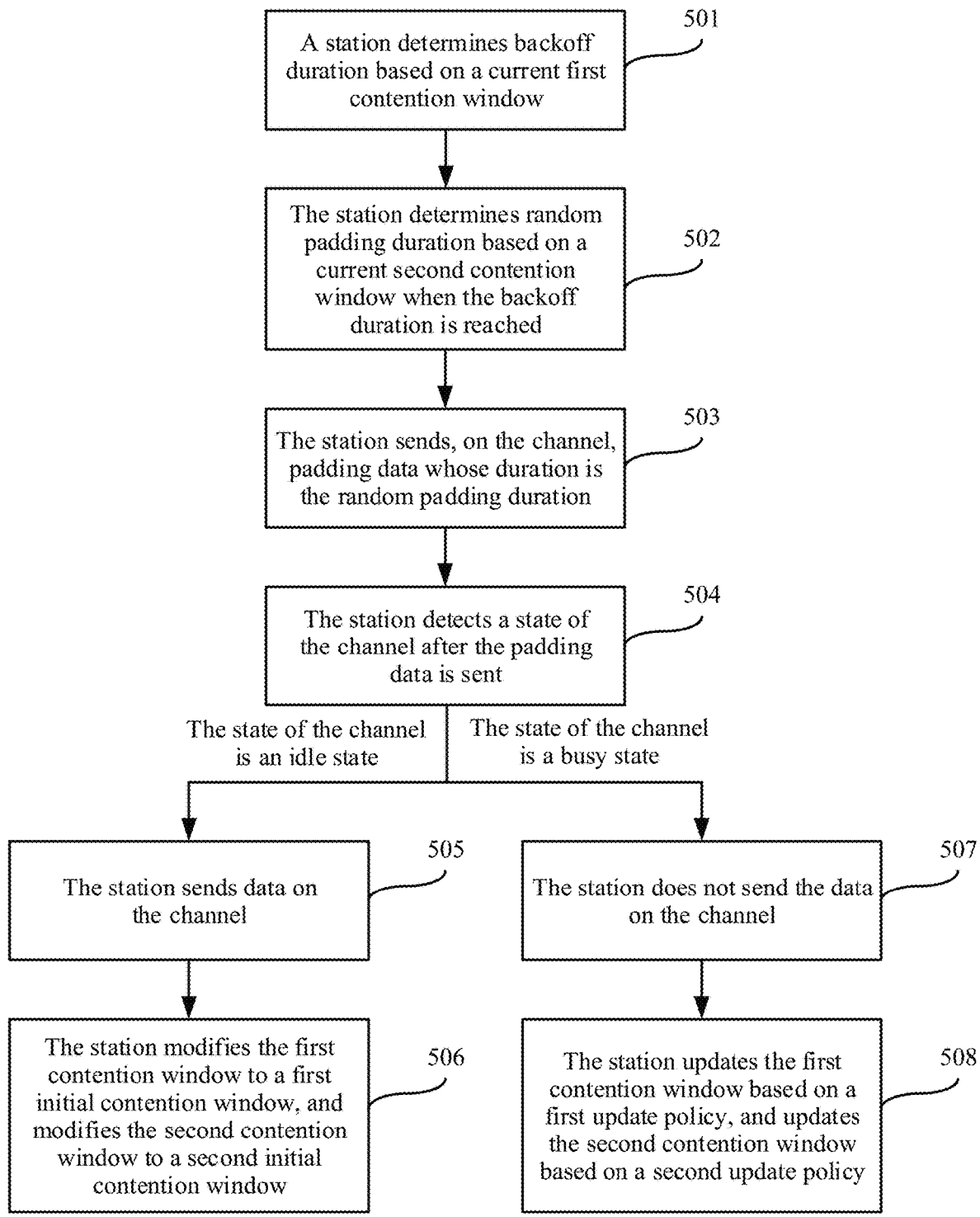
FIG. 5 is a flowchart of an example 1 of a channel access method according to an embodiment of this application.

FIG. 5 is an example of a channel access method according to an embodiment of this application. As shown in FIG. 5, steps are as follows.

Step 501. A station determines backoff duration based on a current first contention window.

Step 502. The station determines random padding duration based on a current second contention window when the backoff duration is reached.

Step 503. The station sends, on a channel, padding data whose duration is the random padding duration.

Step 504. The station detects a state of the channel after the padding data is sent.

If the state of the channel is an idle state, the station performs step 505 and step 506. If the state of the channel is a busy state, the station performs step 507 and step 508.

Step 505. The station sends data on the channel.

Step 506. The station modifies the first contention window to a first initial contention window, and modifies the second contention window to a second initial contention window.

Step 507. The station does not send data on the channel.

Step 508. The station updates the first contention window based on a first update policy, and updates the second contention window based on a second update policy.

For details of processing processes of the step 501 to the step 508, refer to the processing processes in the foregoing embodiment of this application. In addition, the step 505 and the step 506 may be performed at the same time. Alternatively, the steps may be performed in sequence. For example, the step 505 may be performed before the step 506, or the step 506 may be performed before the step 505. This is not limited in this embodiment of this application.

Optionally, before the station sends, on the channel, the padding data whose duration is the random padding duration, the station may further send an L-preamble on the channel, where a value of a length indication field in legacy signaling field in the L-preamble is a sum of a length of a data packet that carries the L-preamble and a length of the padding data.

In implementation, before the station sends the padding data, the station may further send the legacy preamble (L-preamble) on the channel, where the value of the length indication field in the legacy signaling in the L-preamble is the sum of the length of the data packet that carries the L-preamble and the length of the padding data. In this way, after another station receives the L-preamble, the other station may parse the L-preamble to obtain the legacy signaling carried in the L-preamble. Then, the other station may determine, based on the value of the length indication field in the legacy signaling, that the data packet and the padding data are sent on the channel, where the sum of the length of the data packet that carries the L-preamble and the length of the padding data is the value of the length indication field. In this way, the other station may determine that the state of the channel is the busy state, and give up sending data on the channel within duration corresponding to the value of the length indication field.

Figure 6:
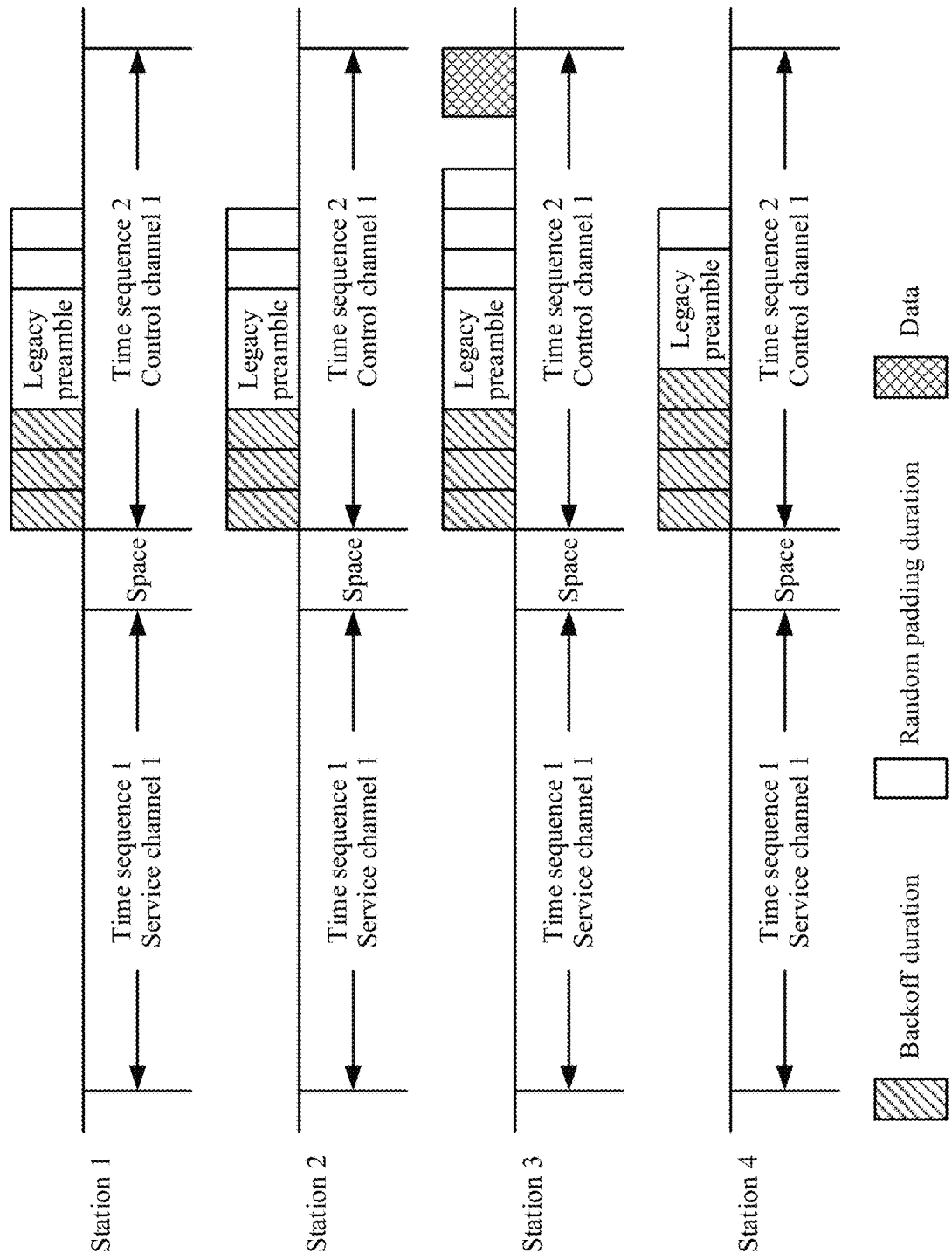
FIG. 6 is a schematic diagram of a channel access method according to an embodiment of this application.

For example, as shown in FIG. 6, before a station 1, a station 2, a station 3, and a station 4 separately send padding data, the station 1, the station 2, the station 3, and the station 4 may further send an L-preamble on a channel. A value of a length indication field in legacy signaling in the L-preamble is a sum of a length of a data packet that carries the L-preamble and a length of the padding data.

Optionally, there may be various data packets that are sent by the station on the channel and that carry the L-preamble. This embodiment of this application provides several feasible manners, which are as follows.

Method 1. The data packet is a physical layer PPDU, and a data field of the PPDU is empty.

In implementation, as shown in FIG. 4, the data packet that is sent by the station on the channel and that carries the L-preamble may be the physical layer protocol data unit (PPDU). The data field of the PPDU is empty. In this way, after another station receives the PPDU, the other station may parse the PPDU to obtain the legacy signaling carried in the L-preamble. Then, the other station may determine, based on the value of the length indication field in the legacy signaling, that the data packet and the padding data are sent on the channel, where the sum of the length of the data packet that carries the L-preamble and the length of the padding data is the value of the length indication field. In this way, the other station may determine that the state of the channel is the busy state, and give up sending data on the channel within duration corresponding to the value of the length indication field.

Method 2. The data packet is the physical layer PPDU, where a media access control (MAC) header in the data field of the PPDU includes a duration field, and a value of the duration field is a sum of the length of the padding data, an SIFS, and a length of the data.

Figure 7:
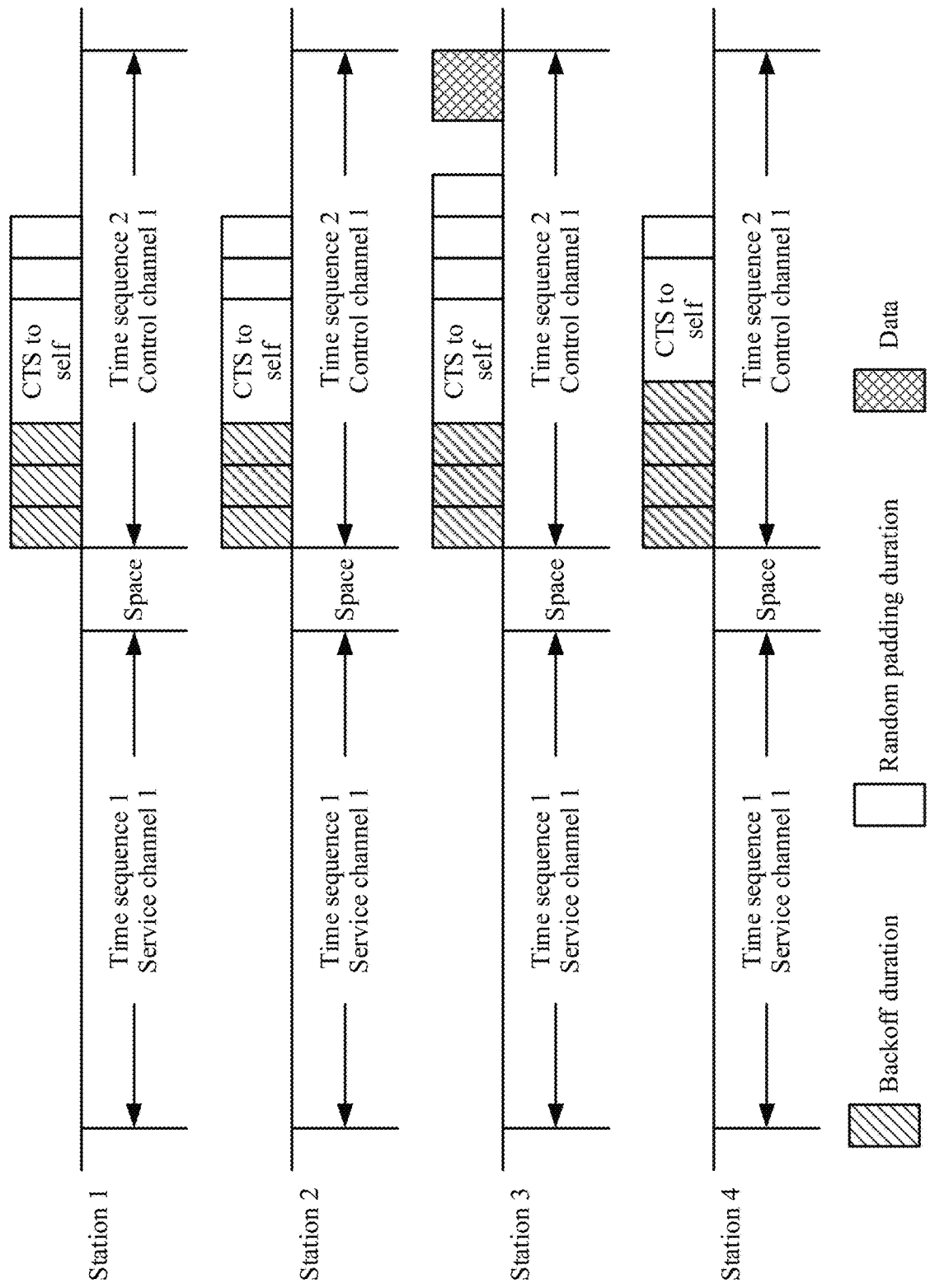
FIG. 7 is a schematic diagram of a channel access method according to an embodiment of this application.

In implementation, the data packet that is sent by the station on the channel and that carries the L-preamble may be the physical layer PPDU. The MAC header in the data field of the PPDU includes the duration field, and the value of the duration field is the sum of the length of the padding data, the short interframe space (SIFS), and the length of the data. The data field in the PPDU may carry a clear to send (CTS) to self frame, or may be a frame of another type. This is not limited in this embodiment of this application. In this way, after the other station receives the PPDU, the other station may parse the PPDU to obtain the duration field carried in the MAC header in the data field of the PPDU. Then, the other station may determine, based on the value of the duration field, that the padding data, the short interframe space, and the data are sent on the channel, where the sum of the length of the padding data, the short interframe space, and the length of the data is the value of the duration field. Therefore, the other station may determine that the state of the channel is the busy state, and give up sending data on the channel within duration corresponding to the value of the duration field. For example, in this embodiment of this application, an example in which a MAC frame carried in the data field in the PPDU is the CTS to self is used for description. As shown in FIG. 7, before the station 1, the station 2, the station 3, and the station 4 separately send the padding data, the station 1, the station 2, the station 3, and the station 4 may further send the CTS to self on the channel. The MAC header in the data field of the CTS to self includes the duration field, and the value of the duration field is the sum of the length of the padding data, the short interframe space SIFS, and the length of the data. It may be understood that the data field of the PPDU may further be of another frame type, for example, a control frame, a management frame, or the like.

Method 3. The data packet is a null data package (NDP).

In implementation, the data packet that is sent by the station on the channel and that carries the L-preamble may be the NDP. In this way, after the other station receives the NDP, the other station may parse the NDP to obtain the legacy signaling carried in the L-preamble. Then, the other station may determine, based on the value of the length indication field in the legacy signaling, that the data packet and the padding data are sent on the channel, where the sum of the length of the data packet that carries the L-preamble and the length of the padding data is the value of the length indication field. In this way, the other station may determine that the state of the channel is the busy state, and give up sending data on the channel within the duration corresponding to the value of the length indication field.

Figure 8:
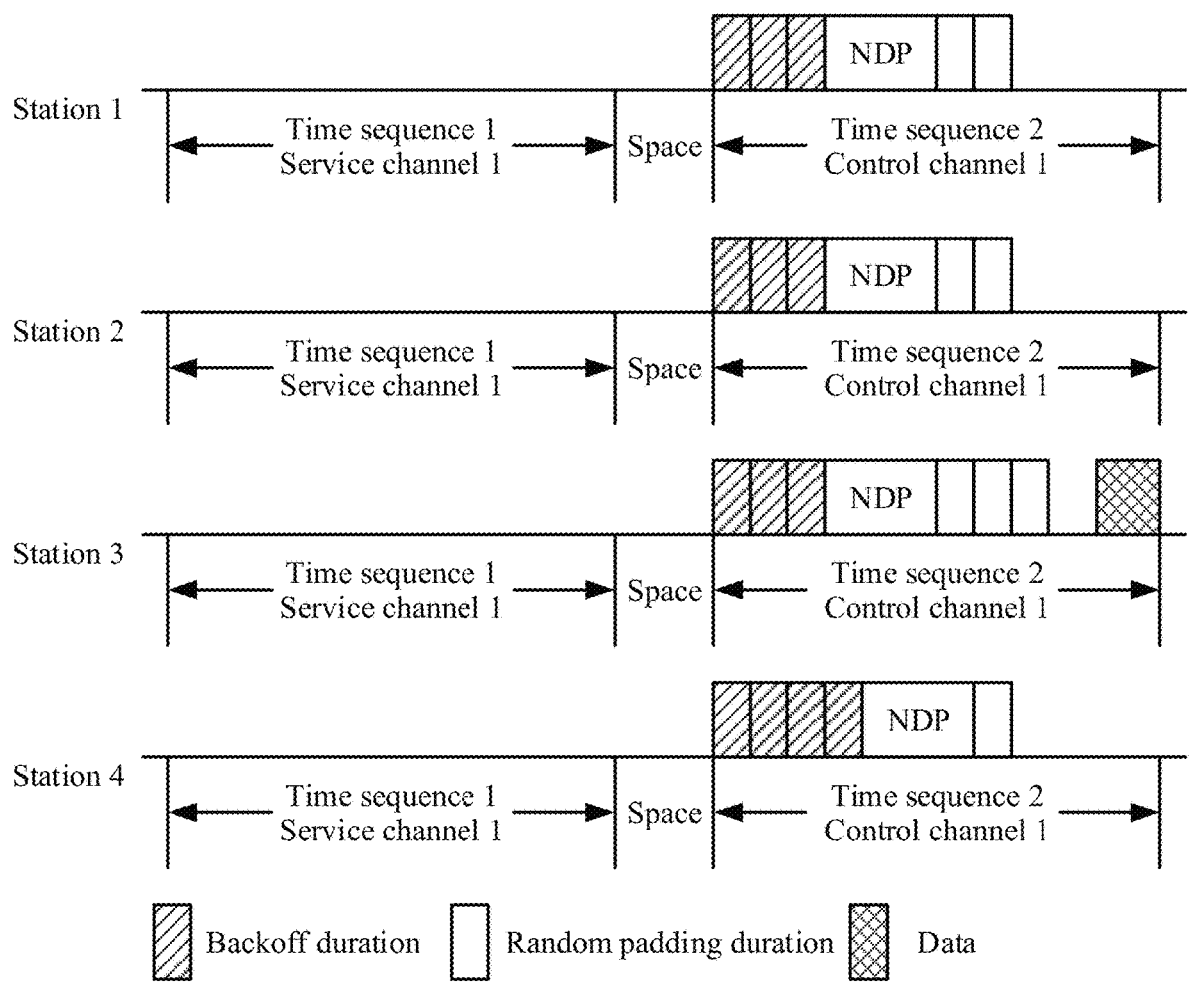
FIG. 8 is a schematic diagram of a channel access method according to an embodiment of this application.

For example, as shown in FIG. 8, before the station 1, the station 2, the station 3, and the station 4 separately send the padding data, the station 1, the station 2, the station 3, and the station 4 may further send the NDP on the channel. The value of the length indication field in the legacy signaling in the L-preamble of the NDP is the sum of the length of the data packet that carries the L-preamble and the length of the padding data.

Figure 9:
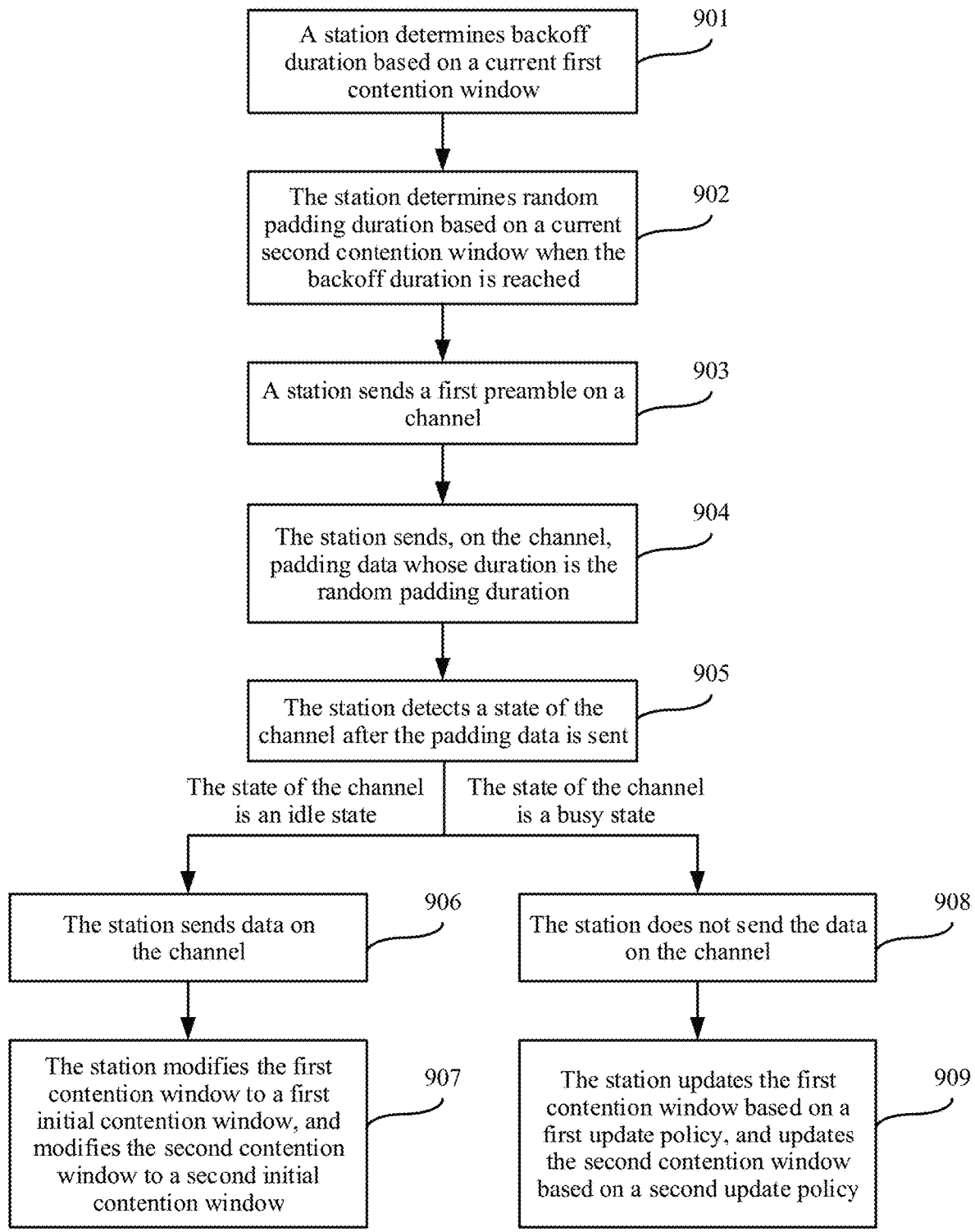
FIG. 9 is a flowchart of an example 2 of a channel access method according to an embodiment of this application.

FIG. 9 is an example 2 of a channel access method according to an embodiment of this application. As shown in FIG. 5, steps are as follows.

Step 901. A station determines backoff duration based on a current first contention window.

Step 902. The station determines random padding duration based on a current second contention window when the backoff duration is reached.

Step 903. The station sends an L-preamble on a channel. A value of a length indication field in legacy signaling in the L-preamble is a sum of a length of a data packet that carries the L-preamble and a length of padding data.

Step 904. The station sends, on the channel, the padding data whose duration is the random padding duration.

Step 905. The station detects a state of the channel after the padding data is sent.

If the state of the channel is an idle state, the station performs step 906 and step 907; if the state of the channel is a busy state, the station performs step 908 and step 909.

Step 906. The station sends data on the channel.

Step 907. The station modifies the first contention window to a first initial contention window, and modifies the second contention window to a second initial contention window.

Step 908. The station does not send data on the channel.

Step 909. The station updates the first contention window based on a first update policy, and updates the second contention window based on a second update policy.

For details of processing processes of the step 901 to the step 909, refer to the processing processes in the foregoing embodiment of this application.

It may be understood that the step 906 and the step 907 may be performed at the same time, or may be performed in sequence. An execution sequence of the two steps is not limited. For example, the step 907 is performed first, and then the step 906 is performed. Similarly, the step 908 and the step 909 may be performed at the same time, or may be performed in sequence. The execution sequence of the two steps is not limited.

Figure 10:
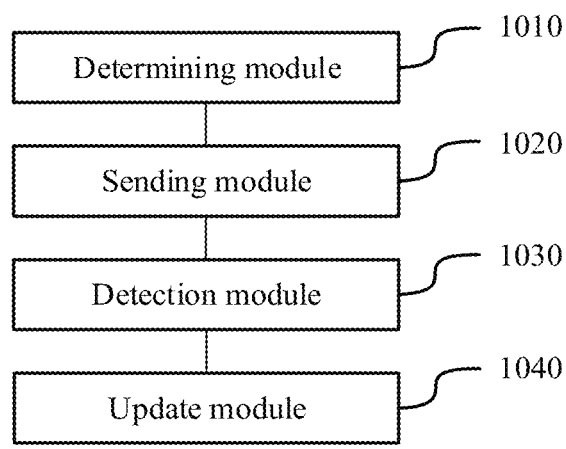
FIG. 10 is a schematic structural diagram of a channel access apparatus according to an embodiment of this application.

Based on a same technical concept, as shown in FIG. 10, an embodiment of this application further provides a channel access apparatus, and the channel access apparatus includes: a determining module 1010 configured to determine backoff duration based on a current first contention window, where the determining module 1010 is further configured to determine random padding duration based on a current second contention window when the backoff duration is reached; a sending module 1020 configured to send, on a channel, padding data whose duration is the random padding duration; and a detection module 1030 configured to detect a state of the channel after the padding data is sent, where the sending module 1020 is further configured to send data on the channel if the state of the channel is an idle state.

In a possible implementation, the sending module 1020 is further configured to skip sending the data on the channel if the state of the channel is a busy state.

In a possible implementation, as shown in FIG. 10, the apparatus further includes: an update module 1040 configured to update the first contention window and/or the second contention window based on the state of the channel.

In a possible implementation, the update module 1040 is configured to update the first contention window based on a first update policy if the state of the channel is the busy state, where the first update policy includes: keeping the first contention window unchanged; multiplying the first contention window by a first coefficient; or adding a constant to the first contention window.

In a possible implementation, the update module 1040 is configured to update the second contention window based on a second update policy if the state of the channel is the busy state, where the second update policy includes: keeping the second contention window unchanged; or multiplying the second contention window by a second coefficient.

In a possible implementation, the update module 1040 is configured to: modify the first contention window to a first initial contention window if the state of the channel is the idle state.

In a possible implementation, the update module 1040 is configured to: modify the second contention window to a second initial contention window if the state of the channel is the idle state.

In a possible implementation, before sending, on the channel, the padding data whose duration is the random padding duration, the sending module 1020 is further configured to send a L-preamble on the channel, where a value of a length indication field in legacy signaling in the L-preamble is a sum of a length of a data packet that carries the L-preamble and a length of the padding data.

In a possible implementation, the data packet is a PPDU, and a data field of the PPDU is empty.

In a possible implementation, the data packet is the physical layer PPDU, where a MAC header in the data field of the PPDU includes a duration field, and a value of the duration field is a sum of the length of the padding data, an SIFS, and a length of the data.

In a possible implementation, the data packet is an NDP.

Figure 11:
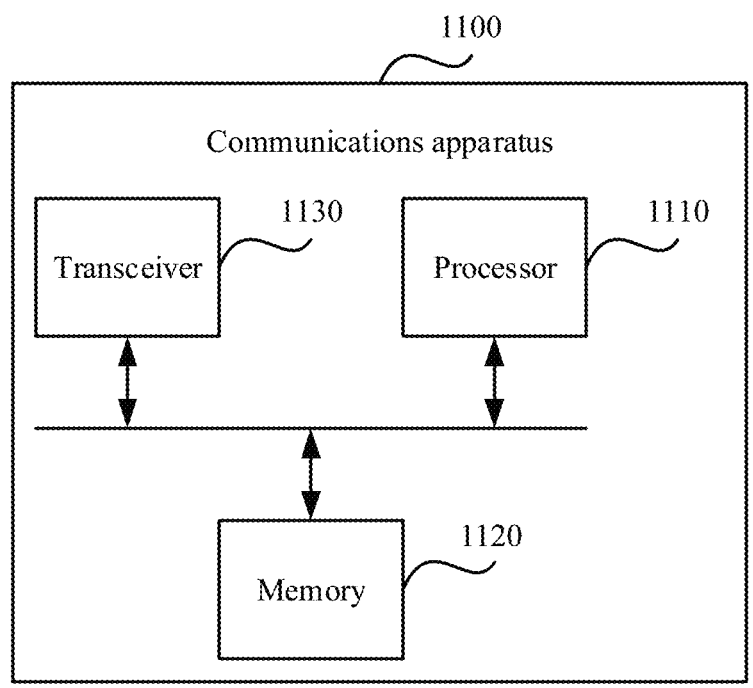
FIG. 11 is a schematic structural diagram of a communications apparatus according to an embodiment of this application.

Based on a same technical concept, as shown in FIG. 11, an embodiment of this application further provides a communications apparatus 1100, and the communications apparatus 1100 includes a processor 1110, a memory 1120, and a transceiver 1130.

The memory 1120 is configured to store a program instruction.

The processor 1110 is configured to perform the following operations based on the program instruction stored in the memory 1120: determining backoff duration based on a current first contention window; determining random padding duration based on a current second contention window when the backoff duration is reached; sending, on a channel, padding data whose duration is the random padding duration using the transceiver 1130; detecting a state of the channel after the padding data is sent; and sending data on the channel using the transceiver 1130 if the state of the channel is an idle state.

In a possible implementation, the processor 1110 is further configured to perform the following operation based on the program instruction stored in the memory 1120: skipping sending the data on the channel using the transceiver 1130 if the state of the channel is a busy state.

In a possible implementation, the processor 1110 is further configured to perform the following operation based on the program instruction stored in the memory: updating the first contention window and/or the second contention window based on the state of the channel.

In a possible implementation, that the processor 1110 updates the first contention window and/or the second contention window based on the state of the channel includes: updating the first contention window based on a first update policy if the state of the channel is the busy state, where the first update policy includes: keeping the first contention window unchanged; multiplying the first contention window by a first coefficient; or adding a constant to the first contention window.

In a possible implementation, that the processor 1110 updates the first contention window and/or the second contention window based on the state of the channel includes: updating the second contention window based on a second update policy if the state of the channel is the busy state, where the second update policy includes: keeping the second contention window unchanged; or multiplying the second contention window by a second coefficient.

In a possible implementation, that the processor 1110 updates the first contention window and/or the second contention window based on the state of the channel includes: modifying the first contention window to a first initial contention window if the state of the channel is the idle state.

In a possible implementation, that the processor 1110 updates the first contention window and/or the second contention window based on the state of the channel includes: modifying the second contention window to a second initial contention window if the state of the channel is the idle state.

In a possible implementation, before the processor 1110 sends, on the channel, the padding data whose duration is the random padding duration, the processor 1110 is further configured to perform the following operation based on the program instruction stored in the memory 1120: sending a L-preamble on the channel using the transceiver 1130, where a value of a length indication field in legacy signaling in the L-preamble is a sum of a length of a data packet that carries the L-preamble and a length of the padding data.

In a possible implementation, the data packet is a PPDU, and a data field of the PPDU is empty.

In a possible implementation, the data packet is the physical layer PPDU, a MAC header in the data field of the PPDU includes a duration field, and a value of the duration field is a sum of the length of the padding data, an SIFS, and a length of the data.

In a possible implementation, the data packet is an NDP.

In a possible implementation, the communications apparatus 1100 may be a station, or may be a chip in the station.

In a possible implementation, the processor 1110 includes the determining module, the detection module, and the update module in the second aspect.

The determining module is configured to: determine the backoff duration based on the current first contention window; and determine the random padding duration based on the current second contention window when the backoff duration is reached.

The detection module is configured to detect the state of the channel after the padding data is sent.

The update module is configured to: update the first contention window based on the first update policy if the state of the channel is the busy state; update the second contention window based on the second update policy if the state of the channel is the busy state; modify the first contention window to the first initial contention window if the state of the channel is the idle state; and modify the second contention window to the second initial contention window if the state of the channel is the idle state. Before the processor sends, on the channel, the padding data whose duration is the random padding duration using the transceiver 1130, the processor is further configured to send the L-preamble using the transceiver 1130, where the value of the length indication field in the legacy signaling in the L-preamble is the sum of the length of the data packet that carries the L-preamble and the length of the padding data.

In a possible implementation, the transceiver 1130 includes the sending module in the second aspect.

The sending module is configured to: send the padding data whose duration is the random padding duration on the channel using the transceiver 1130; send the data on the channel using the transceiver 1130 if the state of the channel is the idle state; and skip sending the data on the channel using the transceiver 1130 if the state of the channel is the busy state.

In a possible implementation, the sending module includes a baseband circuit, a radio frequency circuit, and an antenna.

The baseband circuit is configured to generate the padding data and the data, and send the padding data and the data to the radio frequency circuit.

The radio frequency circuit is configured to perform analog conversion processing, filtering processing, amplification processing, and up-conversion processing on the padding data and the data, and send the padding data and the data to the antenna.

The antenna is configured to send the padding data and the data to another communications apparatus 1100 using a radio frequency signal.

In a possible implementation, the transceiver 1130 is an input/output interface, a pin, or an interface circuit.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A channel access method, comprising:
   determining, by a station, a backoff duration based on a first contention window, wherein the first contention window represents a first range of time slots during which the station waits before starting to send data;
   determining a random padding duration based on a second contention window when the backoff duration is reached, wherein the second contention window represents a second range of time slots during which the station waits before starting to send the data;
   sending, on a channel, padding data whose duration is the random padding duration;
   detecting a state of the channel after the padding data is sent;

sending the data on the channel when the state of the channel is an idle state; and when the state of the channel is a busy state:
skipping sending the data on the channel;
updating the first contention window based on a first update policy wherein the first update policy comprises multiplying the first contention window by a first coefficient; and
updating the second contention window based on a second update policy, wherein the second update policy comprises multiplying the second contention window by a second coefficient.

2. The channel access method of claim 1, further comprising updating at least one of the first contention window or the second contention window when the state of the channel is the idle state.

3. The channel access method of claim 2, wherein updating at least one of the first contention window or the second contention window comprises modifying the first contention window to a first initial contention window when the state of the channel is the idle state.

4. The channel access method of claim 2, wherein updating at least one of the first contention window or the second contention window comprises modifying the second contention window to a second initial contention window when the state of the channel is the idle state.

5. The channel access method of claim 1, wherein before sending the padding data, the channel access method further comprises sending a legacy preamble (L-preamble) on the channel, and wherein a value of a length indication field in legacy signaling in the L-preamble is a sum of a length of a data packet that carries the L-preamble and a length of the padding data.

6. The channel access method of claim 5, wherein the data packet is a physical layer protocol data unit (PPDU), and wherein a data field of the PPDU is empty.

7. The channel access method of claim 5, wherein the data packet is a physical layer protocol data unit (PPDU), wherein a media access control (MAC) header in a data field of the PPDU comprises a duration field, and wherein a value of the duration field is a sum of the length of the padding data, a short interframe space (SIFS), and a length of the data.

8. The channel access method of claim 5, wherein the data packet is a null data packet (NDP).

9. A channel access apparatus, comprising:
a memory having a storage medium configured to store a program; and
a processor in communication with the memory and configured to execute the program to cause the channel access apparatus to:
determine a backoff duration based on a first contention window, wherein the first contention window represents a first range of time slots during which the station waits before starting to send data;
determine a random padding duration based on a second contention window when the backoff duration is reached, wherein the second contention window represents a second range of time slots during which the station waits before starting to send the data;
send, on a channel, padding data whose duration is the random padding duration;
detect a state of the channel after the padding data is sent;
send data on the channel when the state of the channel is an idle state; and
when the state of the channel is a busy state:
skip sending the data on the channel;
update the first contention window based on a first update policy wherein the first update policy comprises multiplying the first contention window by a first coefficient; and
update the second contention window based on a second update policy, wherein the second update policy comprises multiplying the second contention window by a second coefficient.

10. The channel access apparatus of claim 9, wherein the processor is configured to execute the program to cause the channel access apparatus to update at least one of the first contention window or the second contention window when the state of the channel is the idle state.

11. The channel access apparatus of claim 10, wherein the processor is configured to execute the program to cause the channel access apparatus to modify the first contention window to a first initial contention window when the state of the channel is the idle state.

12. The channel access apparatus of claim 10, wherein the processor is configured to execute the program to cause the channel access apparatus to modify the second contention window to a second initial contention window when the state of the channel is the idle state.

13. The channel access apparatus of claim 9, wherein before sending the padding data, the processor is further configured to execute the program to cause the channel access apparatus to send a legacy preamble (L-preamble) on the channel, and wherein a value of a length indication field in legacy signaling in the L-preamble is a sum of a length of a data packet that carries the L-preamble and a length of the padding data.

14. The channel access apparatus of claim 13, wherein the data packet is a physical layer protocol data unit (PPDU), wherein a media access control (MAC) header in a data field of the PPDU comprises a duration field, and wherein a value of the duration field is a sum of the length of the padding data, a short interframe space (SIFS), and a length of the data.

15. A computer program product comprising computer-executable instructions stored on a non-transitory computer-readable storage medium that, when executed by a processor, cause a channel access apparatus to:
determine a backoff duration based on a first contention window, wherein the first contention window represents a first range of time slots during which the station waits before starting to send data;
determine a random padding duration based on a second contention window when the backoff duration is reached, wherein the second contention window represents a second range of time slots during which the station waits before starting to send the data;
send, on a channel, padding data whose duration is the random padding duration;
detect a state of the channel after the padding data is sent;
send the data on the channel when the state of the channel is an idle state; and
when the state of the channel is a busy state:
skip sending the data on the channel;
update the first contention window based on a first update policy wherein the first update policy comprises multiplying the first contention window by a first coefficient; and
update the second contention window based on a second update policy, wherein the second update policy comprises multiplying the second contention window by a second coefficient.

16. The computer program product of claim 15, wherein the computer-executable instructions, when executed by the processor, cause the channel access apparatus to send a legacy preamble (L-preamble) on the channel.

17. The computer program product of claim 16, wherein the value of a length indication field in legacy signaling in the L-preamble is a sum of a length of a data packet that carries the L-preamble and a length of the padding data.

18. The computer program product of claim 17, wherein the data packet is a physical layer protocol data unit (PPDU).

19. The computer program product of claim 18, wherein a media access control (MAC) header in a data field of the PPDU comprises a duration field.

20. The computer program product of claim 19, wherein a value of the duration field is a sum of the length of the padding data, a short interframe space (SIFS), and a length of the data.

* * * * *